(12) United States Patent
Okamoto et al.

(10) Patent No.: US 9,940,121 B2
(45) Date of Patent: Apr. 10, 2018

(54) ELECTRONIC APPARATUS (71) Applicant: KYOCERA Document Solutions Inc., Osaka-shi, Osaka (JP)

(72) Inventors: Kentaro Okamoto, Osaka (JP); Kyota Mitsuyama, Osaka (JP); Koji Ikawa, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 26 days.

(21) Appl. No.: 15/312,102

(22) PCT Filed: May 2, 2016

(86) PCT No.: PCT/JP2016/063567
§ 371 (c)(1),
(2) Date: Nov. 17, 2016

(87) PCT Pub. No.: WO2017/002446
PCT Pub. Date: Jan. 5, 2017

(65) Prior Publication Data
US 2017/0212744 A1 Jul. 27, 2017

(30) Foreign Application Priority Data

Jun. 30, 2015 (JP) .................................. 2015-132052

(51) Int. Cl.
G06F 9/445 (2018.01)
(52) U.S. Cl.
CPC . G06F 8/62 (2013.01); G06F 8/61 (2013.01)
(58) Field of Classification Search
CPC ..................................... G06F 8/62; G06F 8/61

USPC .......................................................... 717/174
See application file for complete search history.

(56) References Cited

U.S. PATENT DOCUMENTS

| 8,601,539 B1* | 12/2013 | Bobel | H04L 63/104 |
| | | | 726/2 |
| 9,778,816 B2* | 10/2017 | Ryu | G06F 8/62 |
| 2011/0264718 A1* | 10/2011 | Chen | G06F 9/45537 |
| | | | 707/831 |

(Continued)

FOREIGN PATENT DOCUMENTS

| JP | 2005024594 A | 1/2005 |
| JP | 2015035098 A | 2/2015 |

*Primary Examiner* — Qing Chen
*Assistant Examiner* — Clint Thatcher
(74) *Attorney, Agent, or Firm* — Alleman Hall Creasman & Tuttle LLP (57) ABSTRACT

An electronic apparatus includes a control portion (1) including: an installation portion (11) that associates the user who performs installation with the installed program; and a program use control portion (17) that permits all users to use a first installed program associated with a first user and permit a second user and a third user who attempts to install a second installed program associated with the second user to use the second installed program. When the third user who is a user other than an administrator attempts to install an application program that the third user is not permitted to use, if the application program is the second installed program, the installation portion (11) does not perform installation and causes the program use control portion (17) to permit the third user to use the second installed program.

13 Claims, 6 Drawing Sheets

(56) References Cited

U.S. PATENT DOCUMENTS

2014/0082611 A1*  3/2014  Li ............................ G06F 8/61
                                                         717/178
2014/0245286 A1*  8/2014  Wong ....................... G06F 8/62
                                                         717/174

* cited by examiner

ELECTRONIC APPARATUS

TECHNICAL FIELD

The present invention relates to an electronic apparatus that is capable of installation of an application program, and a program that runs on a CPU included in the electronic apparatus.

BACKGROUND ART

The functions of electronic apparatuses such as an image forming apparatus have been diversified. In the case where many users share one electronic apparatus, it is not easy to select and provide a function suitable for each user. In this respect, Patent Literature 1 discloses an apparatus that classifies users into classes and determines a usable application for each class.

However, in recent years when functions have been diversified, providing functions desired by all users as standard equipment has been difficult due to a storage capacity and other factors. Thus, a form in which only basic functions are mounted as standard equipment and an extension application program is installed as necessary is the recent mainstream.

Here, installation of an extension application preferably can be performed according to a user's own request. However, in the case where a user is permitted to freely install an extension application, undesired extension applications may accumulate to strain the capacity of an HDD (hard disk drive).

Patent Literature 2 discloses a data processing apparatus that deletes unexecuted firmware from a RAM (random access memory). Even when the firmware is deleted from the RAM, the firmware can be reloaded from an HDD. Thus, the data processing apparatus dynamically manages the RAM capacity.

Moreover, Non-Patent Literature 1 discloses a system that deletes data files, not application programs, based on elapsed days from last update dates or last access dates.

CITATION LIST

Patent Literature

[PTL 1] Japanese Laid-Open Patent Publication No. 2005-024594
[PTL 2] Japanese Laid-Open Patent Publication No. 2015-035098

Non-Patent Literature

[NPTL 1] JustSystems Corporation, GDMS, http://just-enterprise.com/product/gdms/

SUMMARY OF THE INVENTION

Problems to be Solved by the Invention

The system disclosed in Patent Literature 2 or Non-Patent Literature 1 does not perform uninstallation so as to delete an application program from the HDD. Deletion of an application program from the HDD has a great impact on the user, so that finer control is required.

An object of the present invention is to provide an electronic apparatus that is able to delete an unused application program from an HDD without deleting an essential application program, and a program that runs on a CPU included in the electronic apparatus.

Solution to the Problems

An electronic apparatus according to an aspect of the present invention includes a control portion and a storage portion. The storage portion stores an installed program that is an installed application program. The control portion includes: an installation portion that installs the application program based on an instruction from a user; and a program use control portion that controls a usable installed program for each user. The installation portion associates the user who performs installation with the installed program. The program use control portion permits all users to use a first installed program associated with a first user, and permits a second user and a third user who attempts to install a second installed program associated with the second user, to use the second installed program. The first user is a user who is an administrator, and the second user and the third user are users other than the administrator. When the third user attempts to install an application program that the third user is not permitted to use, if the application program is the second installed program, the installation portion does not perform installation and causes the use control portion to permit the third user to use the second installed program.

Advantageous Effects of the Invention

According to the electronic apparatus of the present invention, it is possible to provide an electronic apparatus that is able to delete an unused application program from an HDD without deleting an essential application program.

DESCRIPTION OF EMBODIMENTS

Figure 1:
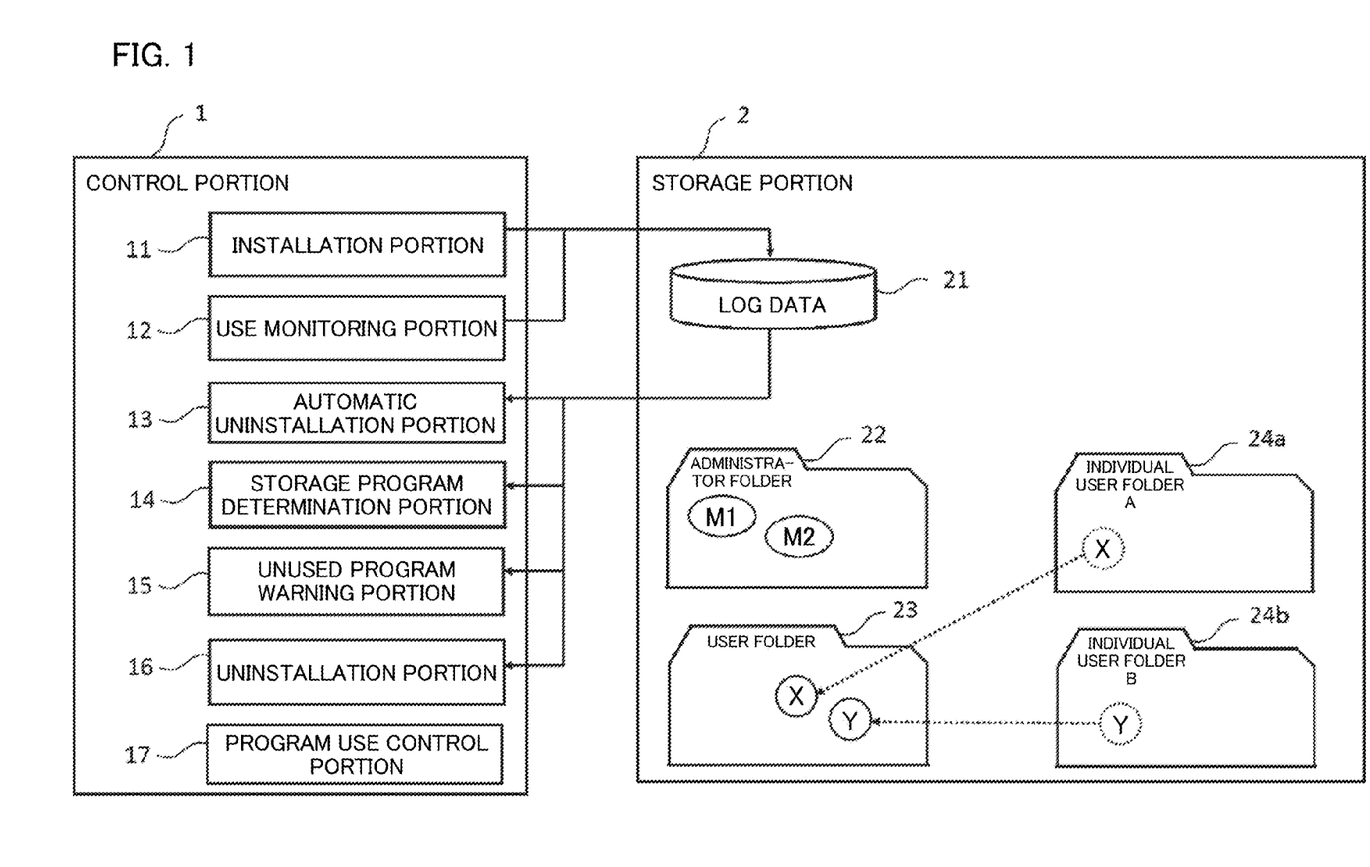
FIG. 1 is a diagram showing the functional configuration of an image forming apparatus.

FIG. 1 is a diagram showing the functional configuration of an image forming apparatus as one form of the electronic apparatus of the present invention. The image forming apparatus includes a control portion 1 and a storage portion 2. The image forming apparatus also includes a printer, a scanner, a FAX, an input portion for user operations, and other components for an image forming apparatus, but the description of those components is omitted since those components are not relevant to the present invention.

The control portion 1 includes an installation portion 11, a use monitoring portion 12, an automatic uninstallation portion 13, a storage program determination portion 14, an unused program warning portion 15, an uninstallation portion 16, and a program use control portion 17.

The image forming apparatus 1 includes a CPU, and the control portion 1 is implemented as a program that runs on the CPU.

The installation portion 11 installs an application program. The details thereof will be described later.

The use monitoring portion 12 monitors use of an application program and converts the use status into data.

The automatic uninstallation portion automatically uninstalls an application program based on its use status, etc. The details thereof will be described later.

The storage program determination portion 14 determines an application program that is excluded from targets of automatic uninstallation, based on its use status. The details thereof will be described later.

The unused program warning portion 15 issues a warning for an application program that is excluded from targets of automatic uninstallation, based on its use status. The details thereof will be described later.

The uninstallation portion 16 responds to an uninstallation instruction from a user. The uninstallation portion 16 actually performs uninstallation in some cases, and does not perform uninstallation in other cases. The details thereof will be described later.

The program use control portion 17 controls use, by each user, of an installed application program. The details thereof will be described later.

The storage portion 12 has log data 21 stored therein. In addition, the storage portion 12 includes an administrator folder 22 and a user folder 23 as folders for installing an extension application program as one form of an application program, and an individual user folder 24 for each user (in the present embodiment, two individual user folders 24, that is, an individual user folder 24*a* for a user A and an individual user folder 24*b* for a user B) in which a shortcut to an installed program is located.

In the drawing, input and output of the log data 21 by each portion included in the installation portion 11 are shown by arrows.

Figure 2:
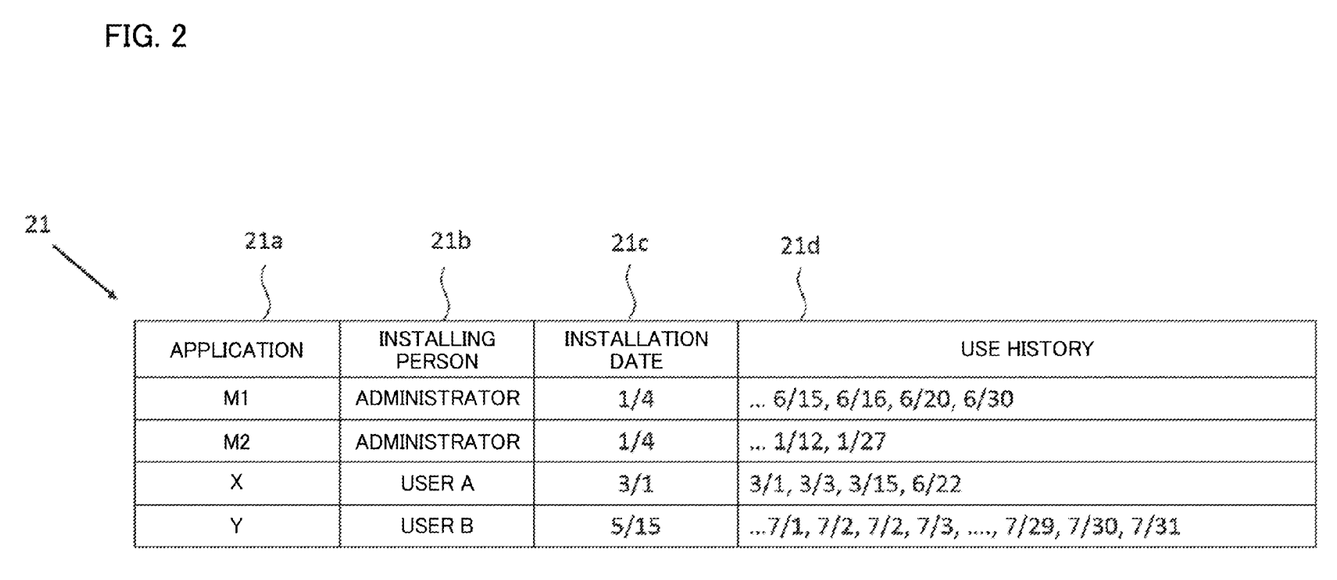
FIG. 2 is a diagram showing an example of log data.

FIG. 2 is a diagram showing an example of the log data. The log data 21 has an application 21*a*, an installing person 21*b*, an installation date 21*c*, and a use status 21*d*.

The application 21*a* is associated with an installing person (a user who performs installation) by the installing person 21*b*.

The installation date 21*c* and the use status 21*d* indicate dates. In the present embodiment, only dates in 2015 are indicated, and Jan. 4, 2015 is indicated simply as "¼" in the drawing. The use status 21*d* indicates a list of dates when the application 21*a* is used. When a plurality of times of use are present at the same date, a plurality of data are present (see an application Y).

Hereinafter, the function of each portion included in the control portion will be described.

Figure 3:
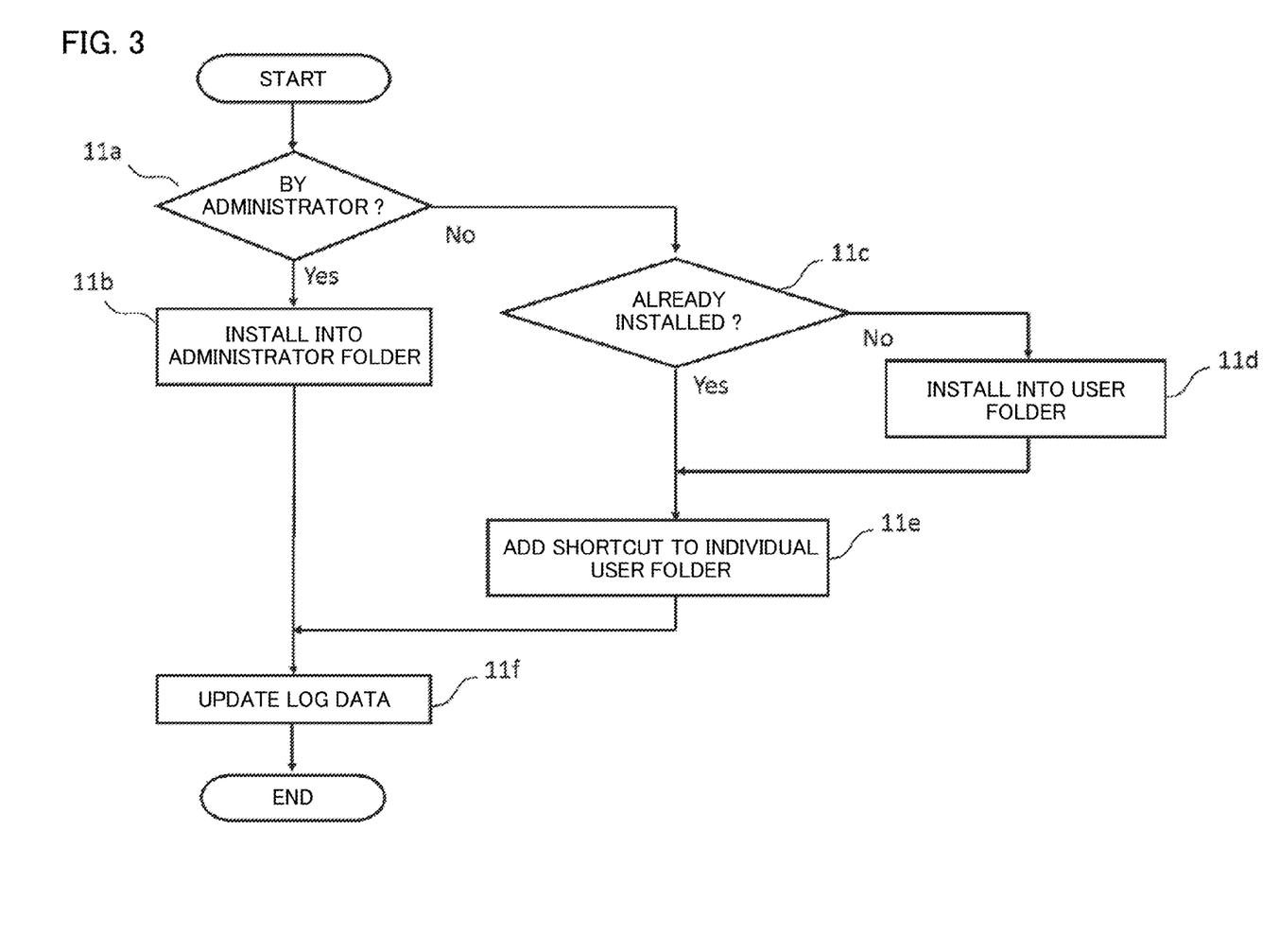
FIG. 3 is a flowchart showing processing of an installation portion.

FIG. 3 is a flowchart showing processing of the installation portion. The installation portion 11 is activated according to an installation request from a user. The installation portion 11 identifies an installing person. When installation is operated in the image forming apparatus (e.g., using a USB stick), the identification may be performed, for example, by reading a card of the user in a user authentication device (not shown) of the image forming apparatus. When installation is operated via a network, the identification may be performed, for example, by requesting log-in of the user. The installation portion 11 determines whether the identified installing person is an administrator (step 11*a*). When the identified installing person is the administrator, the installation portion 11 performs installation into the administrator folder 22 (step 11*b*).

When the identified installing person is not the administrator, the installation portion 11 determines whether an application of which installation is requested is an already-installed application (step 11*c*). When the application is not an already-installed application, the installation portion 11 installs the application into the user folder 23 (step 11*d*). Even when the application is an already-installed application, the application has been similarly installed in the user folder 23, or has been installed in the administrator folder 22.

The installation portion 11 adds, to the individual user folder 24, a shortcut to the application that is installed (or has been installed) (step 11*e*). The addition of the shortcut is performed only for the individual user folder 24 for the installing person (e.g., the individual user folder 24*a* when the installing person is the user A), and is not performed for the other individual user folder 24.

The installation portion 11 updates the log data 21. Specifically, when the installation portion 11 performs installation into the administrator folder 22 or the user folder 23, the installation portion 11 adds one row in the drawing of the log data 21, and writes the application 21*a*, the installing person 21*b*, and the installation date 21*c*. When the installation portion 11 has not performed installation (in the case of a branch of Yes in step 11*c*), since the application 21*a* is present in the log data 21, the installation portion 11 adds the present installing person to the installing person 21*b* associated with this application 21*a*.

An application program installed into the administrator folder 22 is a "first installed program", and an application program installed into the user folder 23 is a "second installed program".

The situation of the administrator folder 22, the user folder 23, the individual user folder 24*a*, and the individual user folder 24*b* in the case where applications M1 and M2 are installed by the administrator, an application X is installed by the user A who is not the administrator, and the application Y is installed by the user B who is not the administrator, is shown in FIG. 1. In the drawing, each solid-line circle indicates an execution file of an installed application, and each dotted-line circle indicates a shortcut to an execution file connected thereto by an arrow.

The program use control portion 17 limits a right of access of each user to the above folders, to the administrator folder 22 and the own individual user folder 24 (the individual user folder 24*a* in the case of the user A, the individual user folder 24*b* in the case of the user B). In the situation shown in FIG. 1, the user A is allowed to use the applications M1, M2, and X, and the user B is allowed to use the applications M1, M2, and Y.

The example has been described above in which the program use control portion 17 determines a usable program for each user, based on the right of access to the folders, but this is possible by another method. For example, since users whose use is possible are stored in the installing person 21*b* of the log data 221 (use by all the users is possible in the case of being stored as "administrator"), if a user uses the image forming apparatus through authentication, the program use control portion 17 can determine a usable program for the user identified through authentication, based on the log data 221. This method is also possible. The method for determining a usable program for each user based on a folder structure is simple, and the same result is obtained even by the other method. Thus, hereinafter, a description will be given with the method based on the folder structure.

The use monitoring portion 12 detects use of a program and adds the detected use to the log data 21 (the use history 21*d* associated with the used application 21*a*). Here, the use of the program involves access to an execution file, and thus can be detected by a publicly known method, for example, as performed also in Non-Patent Literature 1.

The automatic uninstallation portion 13 is activated at an appropriate time (e.g., 2 A.M. daily), refers to the log data 21, and calculates a first use rate of each application 21a. When the installing person 21b is not the administrator and the first use rate is equal to or less than a first value, the application and the shortcut to the application are deleted (automatically uninstalled). In the present embodiment, the first use rate is defined as the number of times of use in the last one month, the first value is set to zero, and the automatic uninstallation portion 13 is activated at 2 A.M. of Aug. 1, 2015. The application X is automatically uninstalled. The application M2 is not automatically uninstalled, since the installing person for the application M2 is the administrator.

Figure 4:
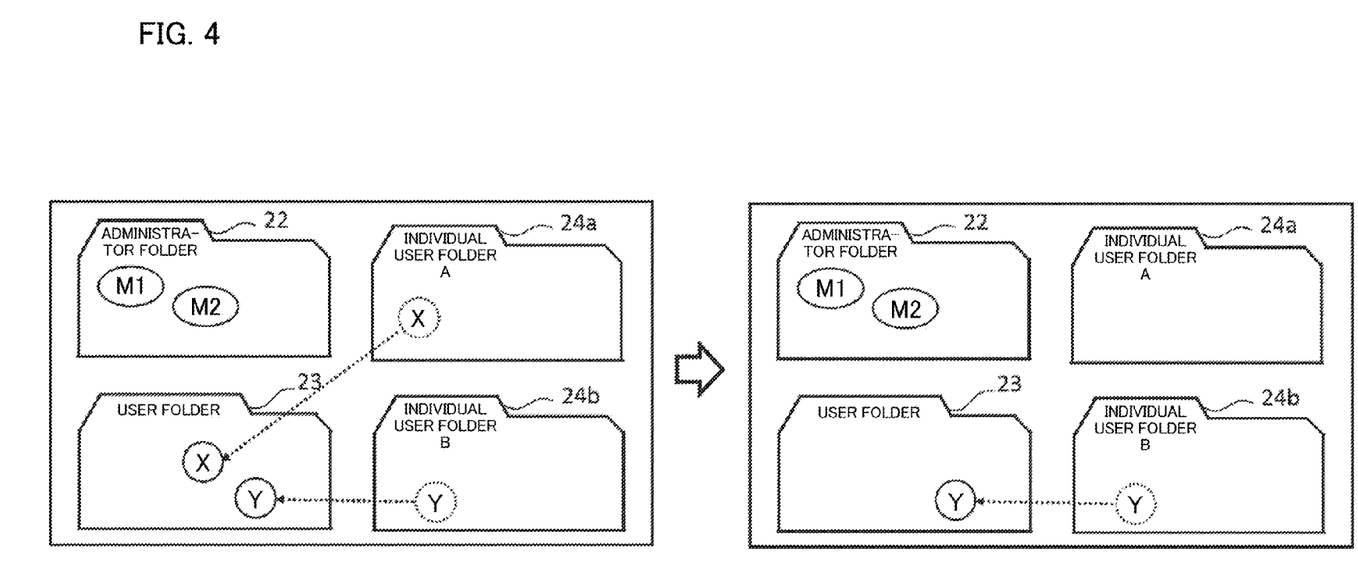
FIG. 4 is a diagram showing processing of an automatic uninstallation portion.

FIG. 4 is a diagram showing processing of the automatic uninstallation portion. The processing shifts from the left side (the same as FIG. 1) of the drawing to the right side of the drawing. That is, the application X and the shortcut to the application X are deleted.

The storage program determination portion 14 is activated at an appropriate time (e.g., 2 A.M. daily), refers to the log data 21, and calculates a second use rate of each application 21a. When the installing person 21b is not the administrator and the second use rate is equal to or greater than a second value, (the execution file) of the application is moved to the administrator folder 22, and the shortcut to the application is deleted. In the present embodiment, the second use rate is defined as the number of times of use in the last one month, the second value is set to 30, and the storage program determination portion 14 is activated at 2 A.M. of Aug. 1, 2015. The application Y is moved to the administrator folder 22 and the shortcut in the individual user folder 24b is deleted. Since the user B has a right of access to the administrator folder 22, the user B continues to be allowed to use the application Y, even though the shortcut is deleted. In addition, the user A becomes allowed to use the application Y.

The operation of the storage program determination portion 14 moving the application Y to the administrator folder 22 is performed by movement of the file. When simple movement of the file has a problem, the application Y only needs to be uninstalled and then be installed into the administrator folder 22.

Figure 5:
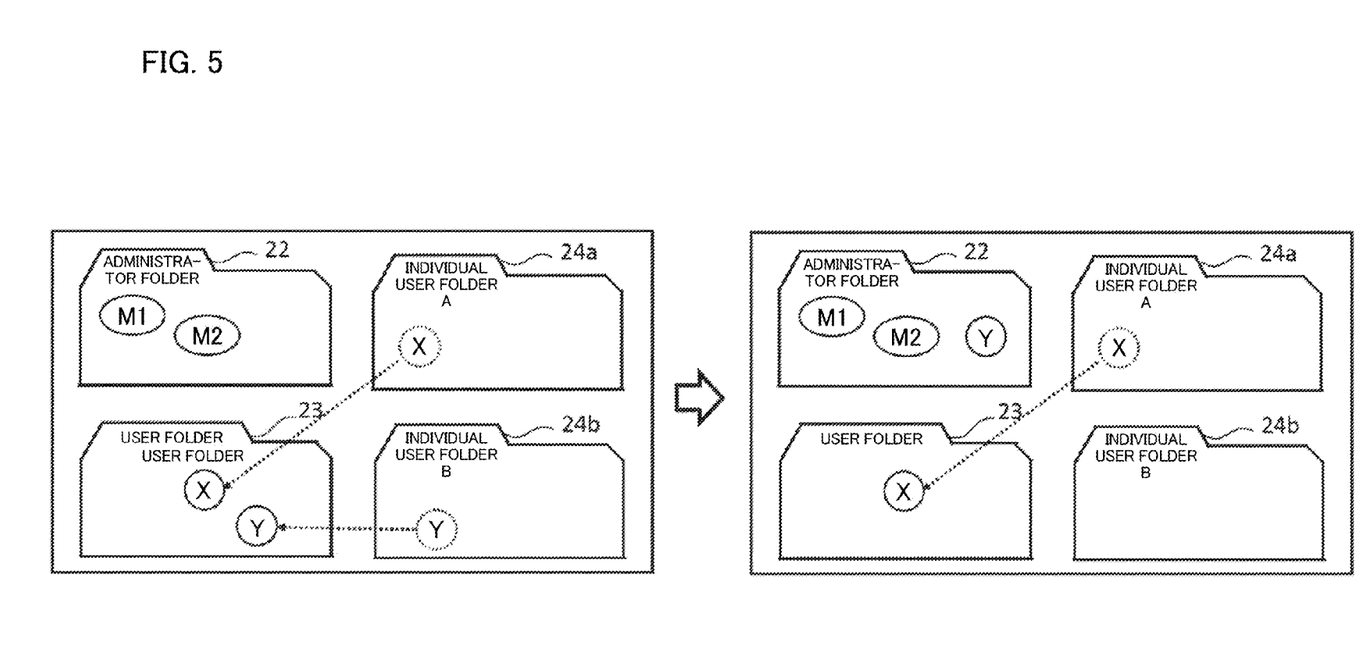
FIG. 5 is a diagram showing processing of a storage program determination portion.

FIG. 5 is a diagram showing processing of the storage program determination portion. The processing shifts from the left side (the same as FIG. 1) of the drawing to the right side of the drawing. That is, the application Y is moved to the administrator folder 22, and the shortcut to the application Y is deleted. In other words, the application Y is changed from a "second installed program" to a "first installed program".

The unused program warning portion 15 is activated at an appropriate time (e.g., 2 A.M. daily), refers to the log data 21, and calculates a third use rate of the application 21a for which the installing person 21b is the administrator. When the third use rate is equal to or greater than a third value, the unused program warning portion 15 sends a notification to the administrator. In the present embodiment, the third use rate is defined as the number of times of use in the last six months, the third value is set to zero, and the unused program warning portion 15 is activated at 2 A.M. of Aug. 1, 2015. A notification about the application M2 is sent to the administrator. As the notification, a mail describing the name of the application that is a warning target may be sent to a mail address of the administrator. The notification is possible by other various methods.

The administrator who has received the notification considers whether to uninstall the application M2, and can uninstall the application M2 if necessary.

The uninstallation portion 16 is activated according to an uninstallation request from a user. The uninstallation portion 16 identifies the uninstalling person. When uninstallation is operated in the image forming apparatus, the identification may be performed, for example, by reading a card of the user in the user authentication device (not shown) of the image forming apparatus. When installation is operated via a network, the identification may be performed, for example, by requesting log-in of the user. The installation portion 11 refers to the log data 21 and determines whether the installing person for the program to be uninstalled is only the uninstalling person. When the installing person is only the uninstalling person, the installation portion 11 uninstalls the application and deletes the shortcut to the application. When the installing person is not only the uninstalling person, the installation portion 11 does not uninstall the application and deletes the shortcut, to the application, in the individual user folder 24 associated with the uninstalling person.

Figure 6:
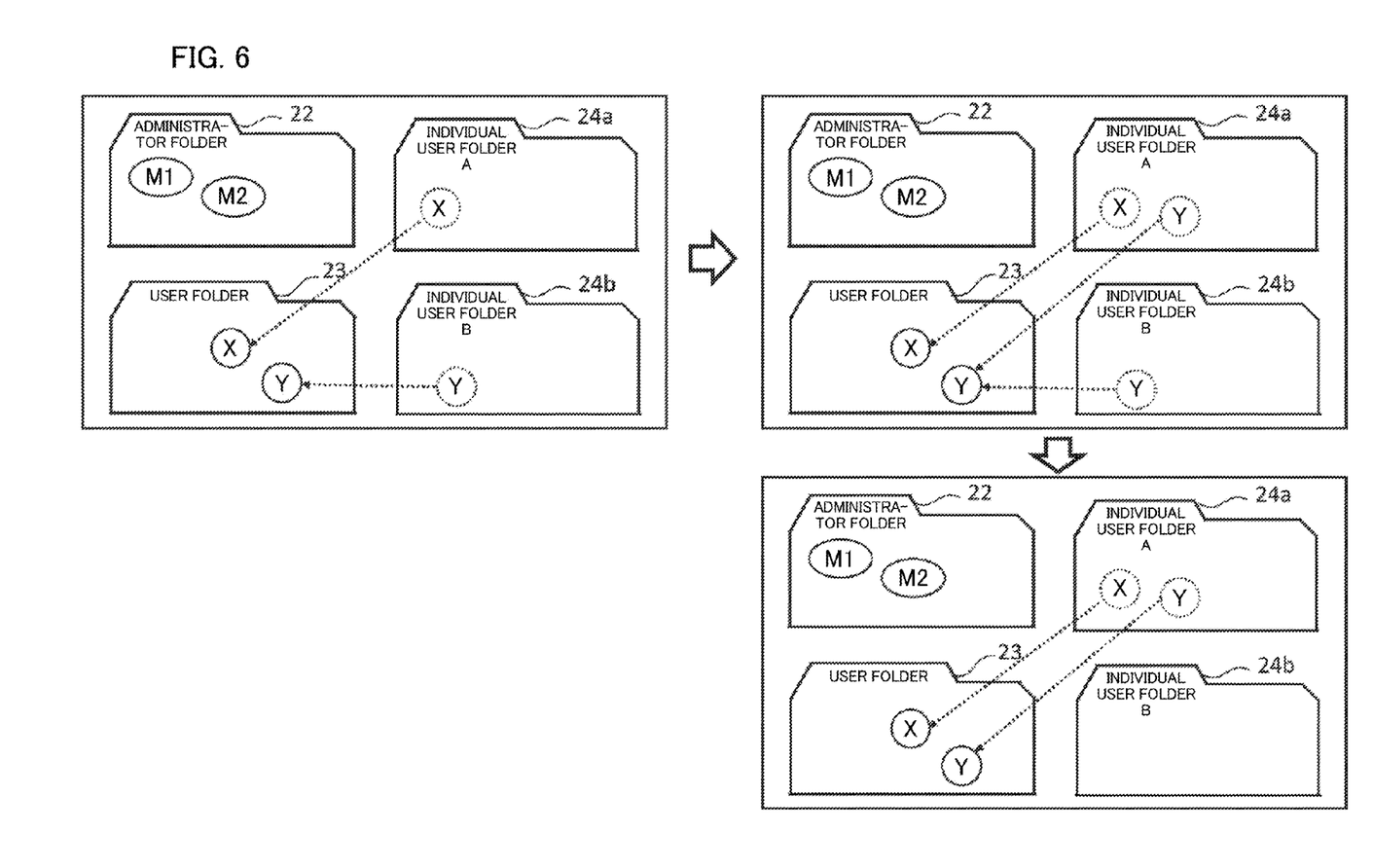
FIG. 6 is a diagram showing the processing of the installation portion and the uninstallation portion.

FIG. 6 is a diagram showing the processing of the installation portion and the uninstallation portion. When the user A attempts to install the application Y, the processing shifts from the left side (the same as FIG. 1) of the drawing to the upper right of the drawing. By the installation portion 11, the application Y is not doubly installed and a shortcut is added to the individual user folder 24a for the user A.

Thereafter, when the user B attempts to uninstall the application Y, the processing shifts to the lower right of the drawing. By the uninstallation portion 16, the application Y is not uninstalled and the shortcut in the individual user folder 24b for the user B is deleted. The user A continues to be allowed to use the application Y.

As described in detail above, according to the image processing apparatus of the present embodiment, an image forming apparatus that is able to delete an unused application program from an HDD without deleting an essential application program is provided.

When the user who is the administrator installs an essential application, the essential application is not deleted. The other applications are administered and uninstalled based on use rates thereof. In addition, even for an application that is installed by the administrator, if the use rate thereof is low, a notification about this application can be sent and this application can be reviewed.

Moreover, also when a plurality of individual users attempt to install/uninstall the same application, support with consistency is provided.

The electronic apparatus of the present invention includes a control portion and a storage portion, wherein the storage portion stores an installed program that is an installed application program, the control portion includes:

an installation portion that installs the application program based on an instruction from a user; and a program use control portion that controls a usable installed program for each user, the installation portion associates the user who performs installation with the installed program, the program use control portion permits all users to use a first installed program associated with a first user, and permits a second user and a third user who attempts to install a second installed program associated with the second user, to use the second installed program, the first user is a user who is an administrator and the second user and the third user are users other than the administrator, and when the third user attempts to install an application program that the third user is not permitted to use, if the application program is the second installed program, the installation portion does not perform installation and causes the use control portion to permit the third user to use the second installed program.

According to this feature, an extension application program that should not be uninstalled can be installed by the user who is the administrator to be excluded from targets of automatic uninstallation. Regarding an extension application program that is installed by a user who is not the administrator, it is possible to prevent double installation of this extension application program.

In the electronic apparatus of the present invention, the control portion includes an uninstallation portion that deletes the installed program based on an instruction from the user, and when the second user attempts to uninstall the second installed program, if the use control portion permits another user to use the second installed program, the uninstallation portion does not delete the second installed program and cause the use control portion not to permit the second user to use the second installed program.

Moreover, in the electronic apparatus of the present invention, when the third user attempts to uninstall the second installed program, if the use control portion permits another user to use the second installed program, the uninstallation portion does not delete the second installed program and causes the use control portion not to permit the third user to use the second installed program.

Moreover, in the electronic apparatus of the present invention, when the user other than the administrator attempts to uninstall the second installed program, if the use control portion does not permit another user to use the second installed program, the uninstallation portion deletes the second installed program.

According to these features, when a user whose use is permitted is not present, the installed program can be deleted, and when a user whose use is permitted is present, the installed program can be prevented from being deleted.

In the electronic apparatus of the present invention, the storage portion includes an administrator folder and a user folder as folders for installing the application program, and an individual user folder, for each user other than the administrator, in which whether the installed program is usable is stored, in a case with an instruction from the first user, the installation portion installs the application program into the administrator folder, in a case with an instruction from the user other than the administrator, if the application program has not been installed in the user folder, the installation portion installs the application program into the user folder and creates a shortcut to the installed program, in the individual user folder for the user who gives the instruction.

Moreover, in the electronic apparatus of the present invention, in a case with an instruction from the user other than the administrator, if the application program has been installed in the user folder, the installation portion does not perform installation and creates a shortcut to the installed program, in the individual user folder for the user who gives the instruction.

Moreover, in the electronic apparatus of the present invention, in a case with an instruction from the first user, the uninstallation portion deletes the installed program, and in a case with an instruction from the user other than the administrator, the uninstallation portion deletes a shortcut, to the installed program, in the individual user folder for the user who gives the instruction, and deletes the installed program if the shortcut to the installed program is not present in the individual user folder for another user.

According to these features, the first installed program and the second installed program can be easily distinguished from each other based on whether each program is installed in the administrator folder or the user folder. In addition, owing to the shortcut in the individual user folder, the user is allowed to use the installed program without being aware of a distinction between the first installed program and the second installed program.

In the electronic apparatus of the present invention, the storage portion stores log data representing a use status of the installed program, the control portion includes:

a use monitoring portion that updates the log data based on use of the installed program; and an automatic uninstallation portion that deletes the installed program based on the log data, and the automatic uninstallation portion does not delete the first installed program, and deletes the installed program associated with the user other than the administrator when a first use rate of the installed program obtained from the log data is equal to or less than a first value.

According to this feature, it is made possible to delete the second installed program based on a use rate thereof while the first installed program is prevented from being deleted.

In the electronic apparatus of the present invention, the first use rate is a number of times of use in a last specific period, and the first value is zero.

According to this feature, only an extension application program that has not been used in a last first predetermined period can be uninstalled. The first predetermined period may be, for example, one month.

In the electronic apparatus of the present invention, the control portion includes a storage program determination portion that makes the second installed program into the first installed program when a second use rate of the second installed program obtained from the log data is equal to or greater than a second value.

According to this feature, the second installed program that is used with high frequency can be excluded from targets of automatic uninstallation.

In the electronic apparatus of the present invention, the second use rate is a value greater than the first use rate.

According to this feature, only the second installed program that has been frequently used in a last predetermined period can be excluded from targets of uninstallation. The second predetermined period may be, for example, one month. In addition, as the second predetermined value, a value other than 20 can be used. In order to be determined to be used with high frequency, the second predetermined value is preferably equal to or greater than 20.

In the electronic apparatus of the present invention, the control portion includes an unused program warning portion that sends a notification to the first user when a third use rate of the first installed program obtained from the log data is equal to or less than a third value.

According to this feature, even for the first installed program, a notification of the first installed program that has been used very little is sent to the user who is the administrator. The user who is the administrator can uninstall, as necessary, an extension application program about which a notification is sent.

In the electronic apparatus of the present invention,
the third use rate is a number of times of use in a last specific period, and the third value is zero.

According to this feature, a notification about an extension application program that has not been used in a last third predetermined period is sent to the user who is the administrator.

The program of the present invention is a program that implements functions of an installation portion, a use monitoring portion, an automatic uninstallation portion, a storage program determination portion, a unused program warning portion, an uninstallation portion, and a program use control portion.

According to this feature, the functions of the above-described electronic apparatus can be implemented by a program.

INDUSTRIAL APPLICABILITY

An electronic apparatus that is able to delete an unused application program from an HDD without deleting an essential application program, and a program that runs on a CPU included in the electronic apparatus, are provided. Use of the electronic apparatus and the program in many companies is conceivable.

The invention claimed is:

1. An electronic apparatus comprising
a control portion and a storage portion, wherein
the storage portion stores an installed program that is an installed application program,
the control portion includes:
an installation portion that installs the application program based on an instruction from a user; and
a program use control portion that controls a usable installed program for each user,
the installation portion associates the user who performs installation with the installed program,
the program use control portion permits all users to use a first installed program associated with a first user, and permits a second user and a third user who attempts to install a second installed program associated with the second user, to use the second installed program,
the first user is a user who is an administrator and the second user and the third user are users other than the administrator, and
when the third user attempts to install an application program that the third user is not permitted to use, if the application program is the second installed program, the installation portion does not perform installation and causes the use control portion to permit the third user to use the second installed program.

2. The electronic apparatus according to claim 1, wherein
the control portion includes an uninstallation portion that deletes the installed program based on an instruction from the user, and
when the second user attempts to uninstall the second installed program, if the use control portion permits another user to use the second installed program, the uninstallation portion does not delete the second installed program and causes the use control portion not to permit the second user to use the second installed program.

3. The electronic apparatus according to claim 2, wherein, when the third user attempts to uninstall the second installed program, if the use control portion permits another user to use the second installed program, the uninstallation portion does not delete the second installed program and causes the use control portion not to permit the third user to use the second installed program.

4. The electronic apparatus according to claim 2, wherein, when the user other than the administrator attempts to uninstall the second installed program, if the use control portion does not permit another user to use the second installed program, the uninstallation portion deletes the second installed program.

5. The electronic apparatus according to claim 2, wherein
the storage portion includes an administrator folder and a user folder as folders for installing the application program, and an individual user folder, for each user other than the administrator, in which whether the installed program is usable is stored,
in a case with an instruction from the first user, the installation portion installs the application program into the administrator folder,
in a case with an instruction from the user other than the administrator, if the application program has not been installed in the user folder, the installation portion installs the application program into the user folder and creates a shortcut to the installed program, in the individual user folder for the user who gives the instruction.

6. The electronic apparatus according to claim 5, wherein, in a case with an instruction from the user other than the administrator, if the application program has been installed in the user folder, the installation portion does not perform installation and creates a shortcut to the installed program, in the individual user folder for the user who gives the instruction.

7. The electronic apparatus according to claim 5, wherein
in a case with an instruction from the first user, the uninstallation portion deletes the installed program, and
in a case with an instruction from the user other than the administrator, the uninstallation portion deletes a shortcut, to the installed program, in the individual user folder for the user who gives the instruction, and deletes the installed program if the shortcut to the installed program is not present in the individual user folder for another user.

8. The electronic apparatus according to claim 1, wherein
the storage portion stores log data representing a use status of the installed program,
the control portion includes:
a use monitoring portion that updates the log data based on use of the installed program; and
an automatic uninstallation portion that deletes the installed program based on the log data, and
the automatic uninstallation portion does not delete the first installed program, and deletes the second installed program when a first use rate of the second installed program obtained from the log data is equal to or less than a first value.

9. The electronic apparatus according to claim 8, wherein the first use rate is a number of times of use in a last specific period, and the first value is zero.

10. The electronic apparatus according to claim 8, wherein the control portion includes a storage program determination portion that makes the installed program into the first installed program when a second use rate of the second installed program obtained from the log data is equal to or greater than a second value.

11. The electronic apparatus according to claim 10, wherein the second use rate is a value greater than the first use rate.

12. The electronic apparatus according to claim 8, wherein the control portion includes an unused program warning portion that sends a notification to the first user when a third use rate of the first installed program obtained from the log data is equal to or less than a third value.

13. The electronic apparatus according to claim 12, wherein the third use rate is a number of times of use in a last specific period, and the third value is zero.

\* \* \* \* \*